(12) United States Patent
Mitterlehner et al.

(10) Patent No.: US 10,281,717 B2
(45) Date of Patent: May 7, 2019

(54) MEASURING THE VIBRATION AMPLITUDE OF A SCANNER MIRROR

(71) Applicant: ZKW Group GmbH, Wieselburg (AT)

(72) Inventors: Thomas Mitterlehner, Mank (AT); Christian Kalousek, Neustift-Innermanzing (AT)

(73) Assignee: ZKW Group GmbH, Wieselburg (AT)

( * ) Notice: Subject to any disclaimer, the term of this patent is extended or adjusted under 35 U.S.C. 154(b) by 58 days.

(21) Appl. No.: 15/529,230

(22) PCT Filed: Oct. 29, 2015

(86) PCT No.: PCT/AT2015/050272
§ 371 (c)(1),
(2) Date: May 24, 2017

(87) PCT Pub. No.: WO2016/081966
PCT Pub. Date: Jun. 2, 2016

(65) Prior Publication Data
US 2017/0329130 A1    Nov. 16, 2017

(30) Foreign Application Priority Data

Nov. 24, 2014 (AT) .................................. 50849/2014

(51) Int. Cl.
*F21S 41/16* (2018.01)
*H04N 1/113* (2006.01)
(Continued)

(52) U.S. Cl.
CPC ............ *G02B 26/105* (2013.01); *F21S 41/14* (2018.01); *F21S 41/16* (2018.01); *F21S 41/675* (2018.01);
(Continued)

(58) Field of Classification Search
CPC ........ G01H 13/00; G01H 9/00; H04N 1/1135; F21S 41/16; F21S 41/675; F21S 41/14; G02B 26/0833; G02B 26/105
(Continued)

(56) References Cited

U.S. PATENT DOCUMENTS 4,800,271 A    1/1989  Blais
5,520,062 A *  5/1996  Watanabe ............ B23K 9/1274
                                              15/250.29
(Continued)

FOREIGN PATENT DOCUMENTS

CN    203350529 U     12/2013
DE    102010003608 A1 11/2011
(Continued)

OTHER PUBLICATIONS

Tortschanoff, A. et al., "Position encoding and phase control of resonant MOEMS mirros," Sensors and Actuators, 2010, vol. 162, Issue 2, pp. 235-240.
(Continued)

*Primary Examiner* — Jacques M Saint Surin
(74) *Attorney, Agent, or Firm* — Eversheds Sutherland (US) LLP

(57) ABSTRACT

For measuring the oscillation amplitude of a scanner mirror in a projection system of a motor vehicle headlight, a laser beam generated by a laser source is directed onto the scanner mirror and reflected by the latter so that the laser beam thus reflected is incident on a detector device (20) that has a plurality of photodetector elements (Q1, Q2, Q3, Q4) and there describes a curve (P) based on the oscillation movement of the scanner mirror. The center point of the curve (P) is offset by an offset value ($x_{offset}$, $y_{offset}$) from the center of the detector device (20). The time period ($t_{ON,X}$, $t_{ON,Y}$) in which the curve passes through the specific detector region
(Continued)

($R_X$, $R_Y$) that corresponds to a coordinate to be measured is determined; and the oscillation amplitude ($x_{pp}$, $y_{pp}$) in the direction of the specific coordinate is determined using the ratio of the time period ($t_{ON,X}$, $t_{ON,Y}$) determined in this manner to the total duration (T) of an oscillation period and the offsets ($x_{offset}$, $y_{offset}$).

12 Claims, 3 Drawing Sheets

(51) Int. Cl.
| | |
|---|---|
| *G01H 13/00* | (2006.01) |
| *F21S 41/14* | (2018.01) |
| *G02B 26/08* | (2006.01) |
| *G02B 26/10* | (2006.01) |
| *F21S 41/675* | (2018.01) |
| *G01H 9/00* | (2006.01) |
| *F21S 41/255* | (2018.01) |

(52) U.S. Cl.
CPC ............... *G01H 9/00* (2013.01); *G01H 13/00* (2013.01); *G02B 26/0833* (2013.01); *H04N 1/1135* (2013.01); *F21S 41/255* (2018.01)

(58) Field of Classification Search
USPC .......................................................... 73/579
See application file for complete search history.

(56) References Cited

U.S. PATENT DOCUMENTS

| | | | | |
|---|---|---|---|---|
| 7,469,834 | B2* | 12/2008 | Schelinski ............. | G01B 11/24 235/462.25 |
| 2003/0021497 | A1 | 1/2003 | Kandori et al. | |
| 2004/0051033 | A1 | 3/2004 | Hagen et al. | |
| 2006/0158666 | A1* | 7/2006 | Schelinski ............. | G01B 11/24 356/614 |
| 2006/0187497 | A1 | 8/2006 | Skurnik et al. | |
| 2006/0269896 | A1* | 11/2006 | Liu .......................... | A61C 7/00 433/29 |
| 2007/0058234 | A1 | 3/2007 | Oettinger et al. | |
| 2011/0084609 | A1 | 4/2011 | Kawaguchi et al. | |
| 2012/0275001 | A1* | 11/2012 | Ishibashi ............... | H04N 9/3129 359/199.1 |
| 2012/0300197 | A1 | 11/2012 | Richter et al. | |
| 2013/0188043 | A1 | 7/2013 | Decoster | |
| 2014/0375898 | A1* | 12/2014 | Kurozuka ........... | G02B 26/085 348/760 |
| 2016/0018256 | A1* | 1/2016 | Mushimoto ........... | G01J 1/0238 356/5.01 |

FOREIGN PATENT DOCUMENTS

| | | |
|---|---|---|
| EP | 2767751 A1 | 8/2014 |
| JP | 2001-012921 A | 1/2001 |
| WO | 2013/100066 A1 | 7/2013 |

OTHER PUBLICATIONS

International Search Report for PCT/AT2015/050272, dated Feb. 8, 2016 (2 pages).
Search report issued in AT application No. A 50849/2014, completed Sep. 9, 2015 (2 pages).

* cited by examiner

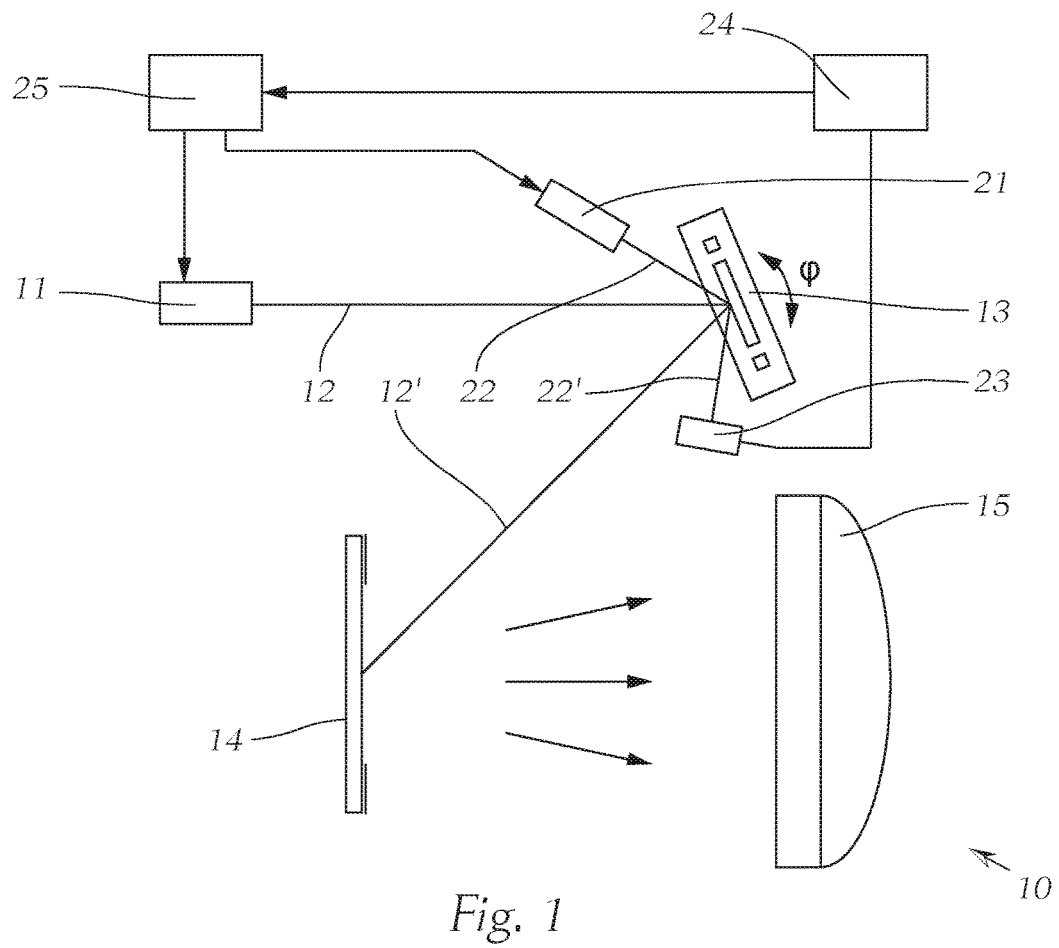
Fig. 1
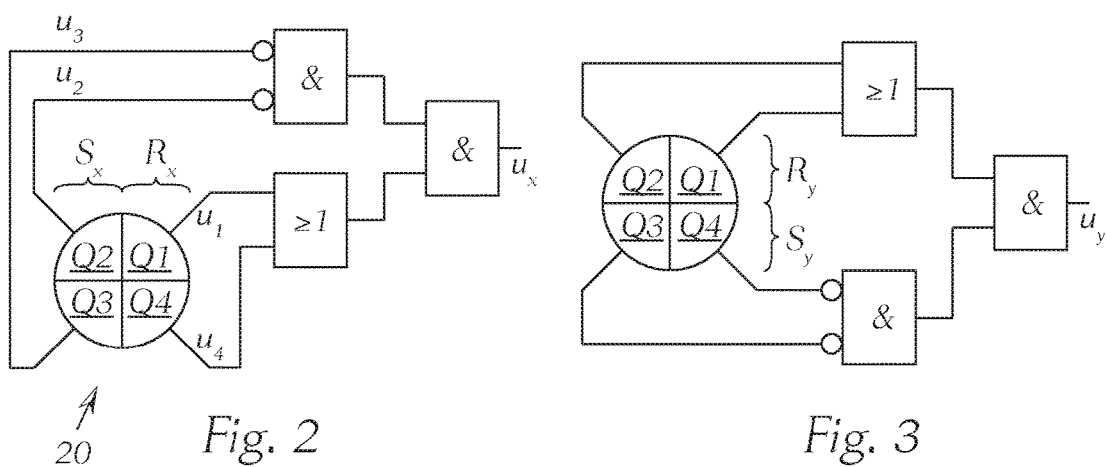
Fig. 2
Fig. 3

MEASURING THE VIBRATION AMPLITUDE OF A SCANNER MIRROR

The invention relates to a method for measuring the oscillation amplitude of a scanner mirror in which a laser beam generated by a laser source is directed onto the scanner mirror and reflected by the latter and the laser beam thus reflected is incident on a detector device. The oscillation movement is evaluated using the detector device.

Methods of this type are used in particular in laser projection systems of headlights and similar illumination systems. Laser projection systems may be realized by deflecting a laser beam using so-called microscanners. These microscanners may be embodied, e.g., as micromirrors produced in MEMS or MOEMS systems (microelectromechanical systems or micro-opto-electromechanical systems) that have a diameter of only a few millimeters and that may be caused to vibrate in one or two axis directions. For proper functioning of such a laser projection system it is very important to detect and electronically process the current deflection (dimension of an angle) of the microscanner so that the modulation of the laser streams may be precisely synchronized with the mirror oscillation to be able to produce a certain pattern, for instance in the form of a standing light distribution.

Essentially, two key metrics of the mirror oscillation must be evaluated, specifically the oscillation amplitude, i.e. the amplitude of the mirror oscillation, and the phase offset or phase position, i.e. the offset in the zero crossing. The oscillation amplitude determines the width of the light pattern produced and must be precisely regulated, as a rule electronically. The phase offset causes a time offset between the control signal of the microscanner and the actual mirror oscillation and may be used for optimum synchronization of the laser modulation.

Different sensors, whose evaluation is frequently very complex, may be used for measuring the mirror oscillation. In this regard, internal sensors (e.g. capacitive, piezoelectric sensors) that are integrated directly in the microscanner are differentiated from external sensors, which may be used independently of the actual microscanner. Generally a PSD (Position Sensitive Detector) is used for an external sensor.

The external sensors must measure the position of a collimated laser beam that has been deflected by the microscanner but that is not being used for actual pattern generation, but rather is used solely and only for measuring position ("measuring laser beam").

Known solutions, such as capacitive feedback measurements, PSDs, or evaluations based on piezo sensors, lead to an electronically complex evaluation, since all of the sensors must measure very small currents or voltages, which is why amplifying circuits, which can be very susceptible to interference, must be employed.

Using a PSD involves great electronic complexity to convert the signals of the PSD such that they can be evaluated electronically (current amplifier, etc.). A much simpler solution is to use quadrant diodes. Quadrant diodes are well known; they contain an arrangement of four flat photodiodes that are the same size and are positioned adjacent to one another in a "quadratic" arrangement, so that a narrow, cross-shaped gap remains between them. These diodes do supply a photocurrent that is a function of the intensity of the incident light, but for the purpose being considered here the photocurrent is suitable for digitally evaluating which of the four quadrants the laser beam is currently disposed in. This makes it possible to measure the phase position with no problem at all. However, an amplitude measurement, which is necessary for realizing the laser projection system, is not possible with quadrant diodes used conventionally.

The invention is therefore to create a method that permits the measuring of the oscillation amplitude of a microscanner, even during use of a simple detector device such as a conventionally-constructed quadrant diode. Specifically, a detector device should be able to be used that has adjacent detector elements (detector fields) that, like a photodiode, supply a signal when light is incident on them, e.g. in the form of a laser beam. It shall be sufficient if the signal indicates whether the specific surface is illuminated (digital signal, On/Off).

This object is attained by a method in which, in accordance with the invention, a detector device is used that has a plurality of photodetector elements arranged adjacent to one another about the center of the detector device, wherein due to the oscillation movement of the scanner mirror the laser beam describes a curve running about a center point via the detector elements; with respect to at least one detector region, each of which is realized by a detector element or a group of immediately adjacent detector elements and corresponds either to the negative or the positive range of a coordinate (pre-specifiable or, e.g. plotted on the detector device or defined on the detector device), the measurement is made in that:

the center point of the curve is offset, by an offset value, from the center of the detector device along the coordinate associated with the specific detector region;

the time period in which the curve passes through the specific detector region is determined;

a value of the oscillation amplitude is determined using the ratio of the time period determined in this manner to the total duration of a oscillation period and the offset value.

A quadrant detector, especially a quadrant diode, may be used for the detector device, wherein four detector fields are arranged about the center thereof, wherein every two adjacent fields of the quadrant detector that are allocated to the coordinates, wherein every two adjacent fields of the quadrant detector that are allocated to the coordinate at which the two fields are positioned on both sides form a detector region.

This inventive solution achieves the stated object in a surprisingly efficient manner and permits electronic evaluation without problems. The invention permits the measurement of oscillation amplitudes with a detector device like a quadrant diode. Since quadrant diodes or detectors based on photoelements are inexpensive and the electronical evaluation of these detectors is very simple, compared to other sensors (e.g. capacity measurement, measurement of low photo diode currents in PSDs), the advantageous results are a more clearly designed measuring method and a cost reduction in the measuring device for executing the inventive measurement method. The inventive method is particularly suitable for measuring the oscillation amplitude of a scanner mirror in a projection system of a motor vehicle headlight.

One refinement of the inventive method provides the embodiment for a plurality of coordinate directions, preferably two coordinate directions. The coordinate directions would be at an angle to one another, preferably at right angles to one another, wherein one detector region is allocated to each coordinate direction, and values of the oscillation amplitude for each associated coordinate direction are determined using the detector regions. The oscillation may occur in the directions of different coordinates at different frequencies.

To attain increased protection against faults, it may be advantageous when a first signal is generated that describes the passage of the curve through the specific detector region, and a second signal is generated that describes the passage of the curve through the area that on the detector device is complementary to the specific detector region, and, using a logical AND operation of the first signal with the negated second signal, a feedback signal is generated that is used to determine the time period in which the curve passes through the specific detector region.

The invention and further details and advantages shall be described in greater detail in the following using an exemplary embodiment that is depicted in the attached drawings.

FIG. 1 is an overview of a laser projection system with a scanner mirror;

FIG. 2 depicts a circuit diagram with a quadrant diode for the inventive evaluation by the X coordinate;

FIG. 3 is a circuit diagram with the quadrant diode from FIG. 2, but for evaluating by the Y coordinate;

Figure 4:
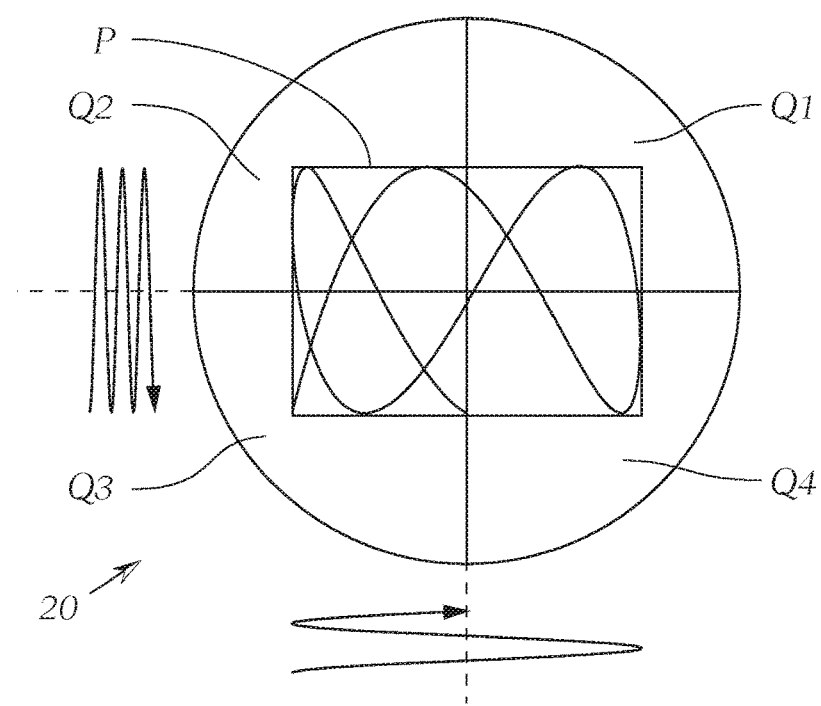
FIG. 4 is a light pattern that is produced as a curve of the laser beam light spot on the quadrant diode.

The exemplary embodiment relates to monitoring and controlling the movement of a MOEMS scanner in a motor vehicle headlight as a typical, if non-limiting, example of a laser projection system.

FIG. 1 is a schematic overview of a laser projection system 10 in a motor vehicle headlight. A first laser 11 (utility or primary laser) produces a first laser beam 12 that is directed via a mirror 13 onto a converter element 14; the mirror 13 is embodied in a manner known, per se, as a MOEMS scanner and may be moved in two angular directions (only one angular direction $\varphi$ is indicated in FIG. 1). Due to the movement of the mirror 13, therefore, a light pattern is generated on the converter element 14 by means of the laser beam 12' reflected thereon by converting the laser radiation into preferably white light. This light pattern is projected outward (e.g. onto a roadway) via an imaging system 15, which comprises at least one lens, for the purpose of illumination.

In addition, a second laser 21 (measuring or control laser) is provided for monitoring and controlling the position of the mirror 13. Given its task, the measuring laser 21 may have much lower power than the utility laser 11 and may possibly also work in a different spectral range. The laser beam 22 of the measuring laser 21 is deflected via the mirror 13 onto a detector device 23. The measuring laser beam 22' incident on the detector device 23 thus experiences deflections that correspond directly to those of the first laser beam 12', although with a different primary beam path. If necessary, the measuring laser beam 22' may be focused on the detector device 23 using an optics unit (not shown). Based on the position of the incidence of the measuring laser beam 22', the detector device 23 produces signals that are supplied to a microcontroller 24 and are evaluated there. The microcontroller 24 forwards a corresponding signal to the control unit 25 of the first laser 11 to regulate the electric modulation of the laser 11 corresponding to the mirror oscillations. The oscillational movement of the mirror is preferably produced using resonant excitation, but if necessary may also be monitored by the control unit (not shown), for instance by controlling the frequency or intensity of the excitation signal.

In the exemplary embodiment, the detector device 23 is embodied as a quadrant diode 20. As seen in FIGS. 2 and 3, the individual deflector surfaces (photo diodes) of the quadrant diode 20 are numbered, counterclockwise, Q1, Q2, Q3, Q4. For instance, the electrical current produced in a photo diode Qn (n=1, . . . 4) may be supplied via a resistor, and the decreasing (time-dependent) voltage un(t) is forwarded directly to an input of the microcontroller 24 or to a logic element upstream thereof. Each detector surface of the quadrants Q1, Q2, Q3, Q4 thus supplies a signal $u1(t)$ . . . $u4(t)$ that is either 1 (symbolizes a signal voltage $u_S>0$) or 0, depending on whether the surface of the quadrant is being illuminated at that time or not. The signal path for the X direction occurs using a logical OR operation $u1(t) \vee u4(t)$ of the signals of quadrants Q1 and Q4, which thus together represent a detector region for the X coordinate.

The signal path for the Y direction is similarly based on a detector region $R_Y$ from the quadrants Q1 and Q2, so that a signal corresponding to the detector region $R_Y$ is produced using a logical OR operation $u1(t) \vee u2(t)$ of the signals of quadrants Q1 and Q2. In addition, it is advantageous when, using a logical AND operation, the (negated) conditions of the remaining quadrants are queried. This permits exclusion of disturbances such as, e.g., based on residual light, and permits reliable evaluation of conditions in which the light spot produced by the laser beam and is incident on the border line between two adjacent fields and thus leads to simultaneous illumination of two (or more) fields or detector regions. In other words, on the one hand the signal of the selected detector region $R_X$, $R_Y$ is formed, and on the other hand the signal for the area $S_X$, $S_Y$, which complements the detector region $R_X$, $R_Y$, is formed, and a "feedback signal" is generated by a logical AND operation for the first signal and the negated second signal.

FIGS. 2 and 3 are schematic examples of the processing of the signals for the quadrant diode 20 corresponding to the aforesaid. FIG. 2 illustrates one possible example of circuitry for the evaluation according to the X coordinate, specifically whether the position of the laser beam is a positive x>0 of the X coordinate. This is a symbolic operation $$U_X = (u1 \vee u4) \wedge \overline{(u2 \vee u3)},$$

wherein for the sake of better readability the time dependence of the signals un(t) was left out. The evaluation according to positive values y>0 of the Y coordinate occurs analogously according to $$U_Y = (u1 \vee u2) \wedge \overline{(u3 \vee u4)},$$

which is illustrated as an example in FIG. 3. Instead of being realized using logic gates, the logical evaluation may also of course occur in the microcontroller 24, for instance in a program-controlled manner.

Figure 5:
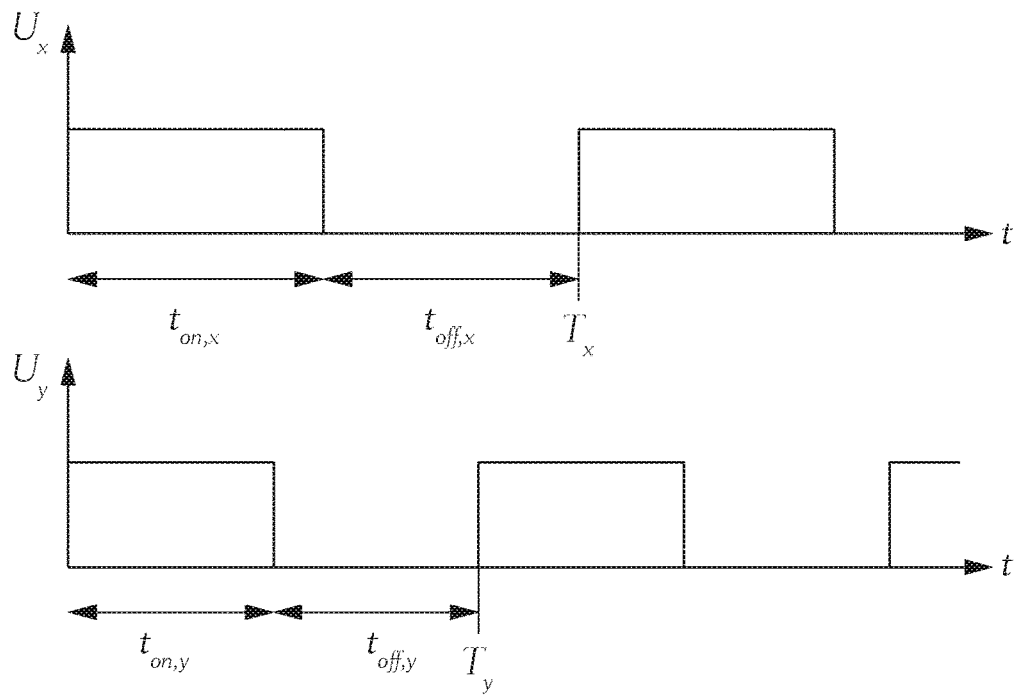
FIG. 5 depicts the signal paths for the light pattern in FIG. 4.

According to conventional measuring methods, a quadrant diode would be used such that a light distribution P, which is produced by the position laser and the microscanner and is typically contained in a rectangle ("rectangular light distribution," for instance a Lissajou figure), is incident exactly in the center of the quadrant diode, as is shown in FIG. 4. The light distribution P is the curve that the laser light spot, which is produced on the detector surface of the quadrant diode, passes through. The light spot moves, e.g., at a first frequency in the X direction (from left to right and back) and at a second frequency in the Y direction (from top to bottom and back), wherein the first and the second frequencies in general are different; the two frequencies selected typically have a whole number ratio so that a closed Lissajou figure results. Evaluating the individual quadrants yields feedback signals $U_X(t)$ and $U_Y(t)$, which can follow the paths illustrated in FIG. 5, for example. An ON time $t_{ON,X}$ or $t_{ON,Y}$ is determined for each signal, specifically the time period for which the signal in question is >0. The ON times may be related to the periods $T_X$ or $T_Y$ of the mirror oscillation and then yields a relative ON time $t_{ON,X}/T_X$ or $t_{ON,Y}/T_Y$, which may be expressed, e.g., as a percentage. The time period in which a signal=0 is consequently called $t_{OFF,X}$ or $t_{OFF,Y}$ (off time).

If the position of the rectangular light distribution is on the center of the detector surface, the relative ON time is 50%. This permits only the determination of the time at which the center position is passed through, while an evaluation of the spatial amplitude of the oscillation for the X and Y directions is not possible.

Figure 6:
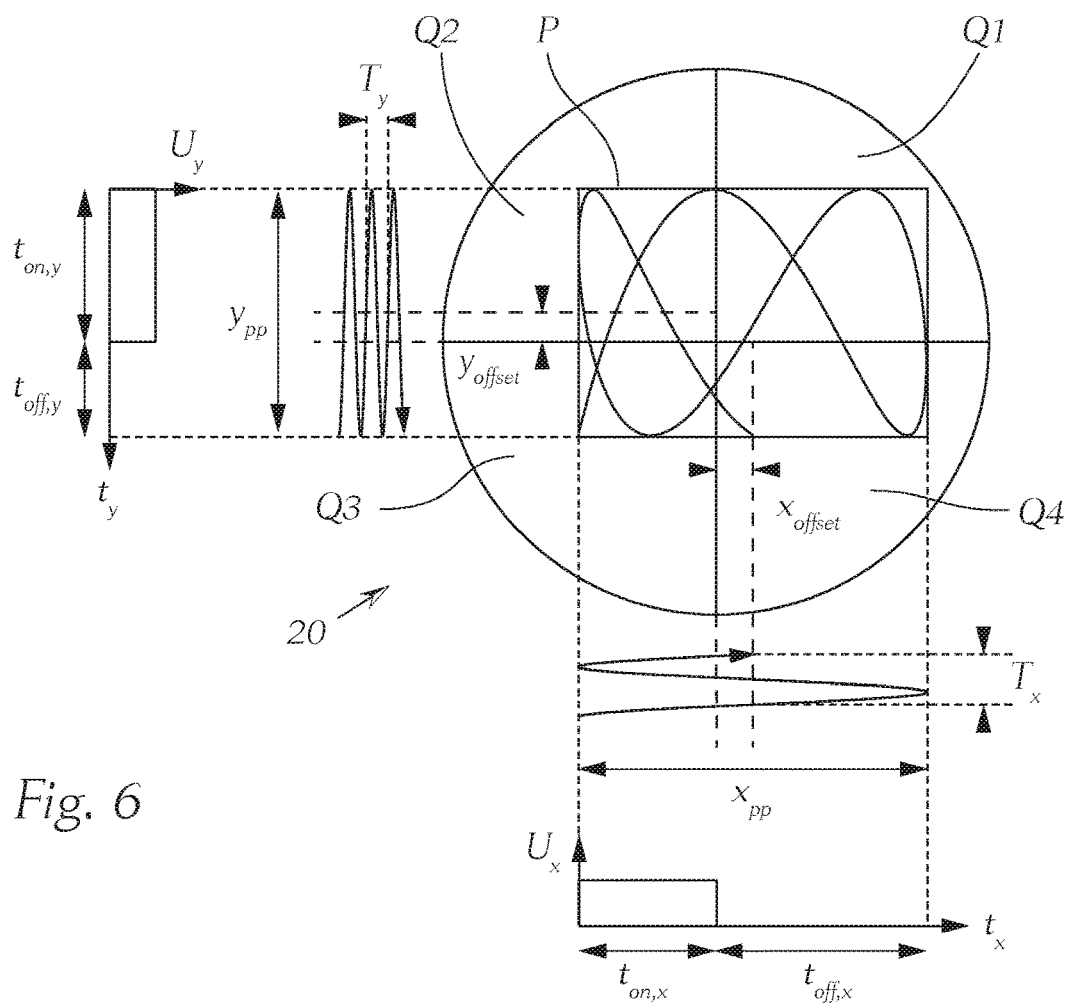
FIG. 6 depicts a light pattern similar to that in FIG. 4, but with an offset from the center; and, FIG. 7 depicts the signal paths for the light pattern in FIG. 6.

According to the invention, the center point of the light distribution P produced by position laser and microscanner, both in the X direction and in the Y direction, is provided with a small offset $x_{offset}$, $y_{offset}$, the magnitude of which is precisely defined. This is illustrated in FIG. 6. The offset is adjusted once for the system, wherein the values $x_{offset}$, $y_{offset}$ are measured and adjusted to a pre-defined value, for instance with a camera system (not shown) used during the configuration; the offset remains the same after this configuration. Instead of provided pre-defined values, the values $x_{offset}$, $y_{offset}$ that result during the configuration may be measured, if the center point is within a suitable region. The values determined in this manner are stored, e.g., in the microcontroller 24 or a memory associated therewith. The offset values $x_{offset}$, $y_{offset}$ are thus available for subsequent evaluations of the oscillation movement as described in the following.

Figure 7:
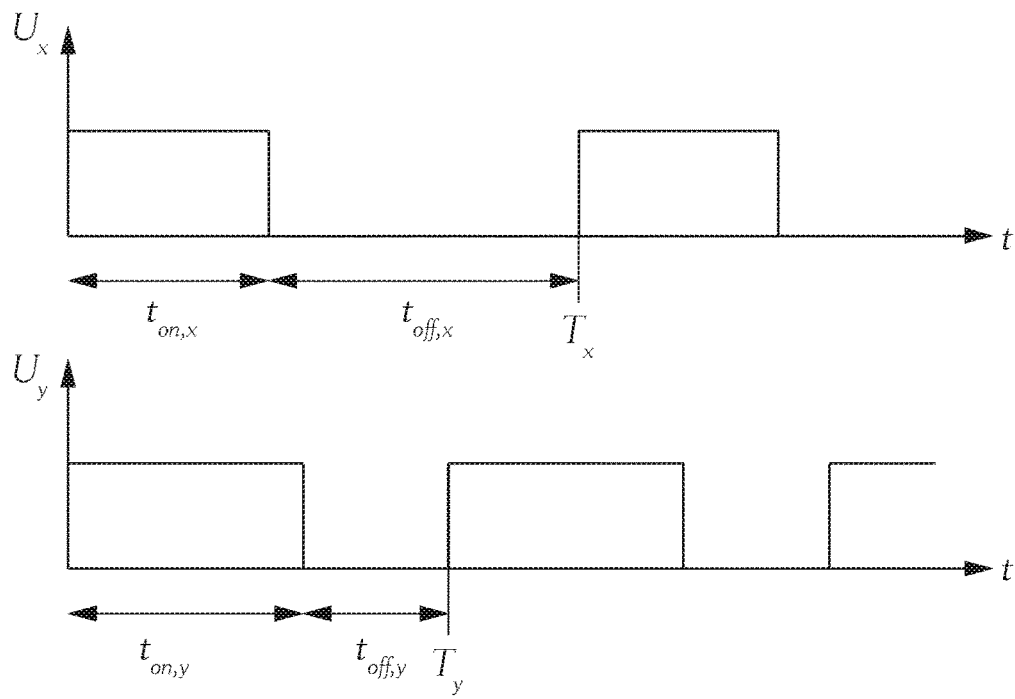

FIG. 7 illustrates an example of an associated signal path for the feedback signals $U_X(t)$ and $U_Y(t)$. As may be seen, the ON time deviates from 50%, wherein the value of the deviation is a function of the maximum deflection of the light distribution. Based on knowing the movement pattern for the laser light spot (in the case of a Lissajou figure, this is a sinusoidal path that is produced by a resonant oscillation of the microscanner), it is simple to calculate the oscillation amplitude of the microscanner by measuring the ON time (time measurement).

For instance, the oscillation amplitude $x_p$ may be calculated as follows:

$$x_p = x_{pp}/2 = x_{offset}/\sin(\pi \cdot (T_X - 2t_{ON,X})/2T_X))$$

$$= x_{offset}/\cos(\pi \cdot t_{ON,X}/T_X)$$

where the following abbreviations are used:
$x_p$ . . . Oscillation amplitude in the X direction,
$x_{pp}$ . . . Peak-to-peak deflection of the mirror oscillation along the X direction, $x_{pp}=2\,x_p$;
$x_{offset}$ . . . Offset in the X direction between center point of the light distribution and center point of the quadrant diode (projection of the offset vector in the X direction),
$T_X$ . . . Period of the mirror oscillation ($T_X=1/f_X$, $f_X$=oscillation frequency),
$t_{ON,X}$ . . . ON time of the feedback signal $U_X$.

The formula may likewise be applied mutatis mutandis for any desired coordinate direction, wherein then, instead of $x_p$, the oscillation amplitude goes in the coordinate direction in question and, instead of $x_{offset}$, the projection of the offset vector goes in the coordinate direction. The formula may naturally in particular be applied for the oscillation amplitude in the Y direction:

$$y_p = y_{pp}/2 = y_{offset}/\sin(\pi \cdot (T_Y - 2t_{ON,Y})/2T_Y)) = y_{offset}/\cos(\pi \cdot t_{ON,Y}/T_Y)$$

with analogous definitions of the variables $y_p$, $y_{pp}$, $y_{offset}$.

According to the invention, therefore, the time measurement and conversion to the value of the oscillation amplitude may be realized very simply by means of digital logical evaluation using discrete logic components and/or the microcontroller. (The relationship between the light curve and the ratios $t_{ON,X}:t_{OFF,X}$ or $t_{ON,Y}:t_{OFF,Y}$ is illustrated symbolically in FIG. 7, because due to the inherent nonlinearity this does not correspond directly to the graphic ratio, but rather only in an approximation).

If the oscillation is not sinusoidal, instead of using the sine or cosine function a different function corresponding to the oscillation mode may be used, and the calculation with this mode is as follows:

$$x_p = x_{offset}/f(t_{ON,X}/T_X),$$

$$y_p = y_{offset}/f(t_{ON,Y}/T_Y)$$

For a triangular shape, e.g. a linear function $f(x)=1-2x$ would be used. The person skilled in the art may determine function f without nothing further according to the oscillation mode.

It is understood that the exemplary embodiment merely serves to illustrate the invention and the invention is not limited thereto. In addition, the person skilled in the art may undertake a wide variety of modifications, additions, and/or replacements, provided they fall within the protective scope according to the claims. For instance, a detector device could be used that works with more than four detector surfaces that are arranged about the center of the device, e.g. in the form of six, eight, or more sector-like surfaces.

The invention claimed is:

1. A method for measuring the oscillation amplitude of a scanner mirror (13) in a projection system (10) of a motor vehicle headlight, in which a laser beam (22) generated by a laser source (21) is directed onto the scanner mirror (13) and reflected by the latter and the laser beam (22') thus reflected becomes incident on a detector device (23), the method comprising:

using a detector device (23) that has a plurality of photodetector elements (Q1, Q2, Q3, Q4) arranged adjacent to one another about its center, wherein due to oscillation movement of the scanner mirror (13) the laser beam (22') describes a curve (P) running about a center point via the detector elements, wherein, with respect to at least one specific detector region ($R_X$, $R_Y$), each detector region is realized by one of the photodetector elements or a group of immediately adjacent photodetector elements of the plurality of photodetector elements and corresponding either to the negative or the positive range of a coordinate, and the center point of the curve (P) is offset by an offset value ($x_{offset}$, $y_{offset}$) from the center of the detector device (23) along the coordinate associated with the specific detector region ($R_X$, $R_Y$);

determining the time period ($t_{ON,X}$, $t_{ON,Y}$) in which the curve passes through the specific detector region ($R_X$, $R_Y$); and determining a value of the oscillation amplitude ($x_p$, $y_p$) using the ratio of the determined time period ($t_{ON,X}$, $t_{ON,Y}$) to the total duration (T) of an oscillation period and the offset value ($x_{offset}$, $y_{offset}$).

2. The method of claim 1, wherein a quadrant detector is used for the detector device (23), and has four detector fields (Q1-Q4) arranged about the center thereof, wherein every two adjacent fields of the quadrant detector that are allocated to the coordinate at which the two fields are positioned on both sides form a detector region ($R_X$, $R_Y$).

3. The method of claim 1, which is configured for a plurality of coordinate directions, wherein the coordinate directions are disposed at an angle to one another and one detector region ($R_X$, $R_Y$) is allocated to each coordinate direction, and values of the oscillation amplitude ($x_p$, $y_p$) for each associated coordinate direction are determined using the detector regions.

4. The method of claim 3, wherein the oscillation occurs in the directions of different coordinates at different frequencies.

5. The method of claim 1, comprising generating a first signal that describes the passage of the curve through the specific detector range ($R_X$, $R_Y$), and generating a second signal that describes the passage of the curve through the area ($S_X$, $S_Y$) that on the detector device is complementary to the specific detector region ($R_X$, $R_Y$), and, using a logical AND operation of the first signal with the negated second signal, generating a feedback signal ($U_X$, $U_Y$) that is used to determine the time period ($t_{ON,X}$, $t_{ON,Y}$) in which the curve passes through the specific detector region ($R_X$, $R_Y$).

6. A method of illumination comprising:
measuring the oscillation amplitude of a scanner mirror in a projection system (10) of a motor vehicle headlight according to the method of claim 1; and
directing a utility laser beam (12) onto a converter element (14) using the scanner mirror to produce a light pattern that is projected outward for the purpose of illumination.

7. The method of claim 2, wherein the quadrant detector comprises a quadrant diode (20).

8. The method of claim 3, wherein the plurality of coordinate directions is two coordinate directions.

9. The method of claim 3, wherein the coordinate directions are disposed at a right angle to one another.

10. A method for illumination from a motor vehicle headlight, the method comprising:
measuring the oscillation amplitude of a scanner mirror in a projection system (10) of the motor vehicle headlight according to the method of claim 5; and
directing a utility laser beam (12) onto a converter element (14) using the scanner mirror to produce a light pattern that is projected outward for the purpose of illumination.

11. The method of claim 10, wherein the detection device comprises a quadrant diode (20) and has four detector fields (Q1-Q4) arranged about the center thereof, wherein every two adjacent fields of the quadrant detector that are allocated to the coordinate at which the two fields are positioned on both sides form a detector region ($R_X$, $R_Y$).

12. The method of claim 10, which is configured for two coordinate directions, wherein the coordinate directions are disposed at a-right angle to one another, and one detector region ($R_X$, $R_Y$) is allocated to each coordinate direction, and values of the oscillation amplitude ($x_p$, $y_p$) for each associated coordinate direction are determined using the detector regions.

* * * * *